(12) United States Patent
Sarkar et al.

(10) Patent No.: US 12,184,736 B2
(45) Date of Patent: Dec. 31, 2024

(54) MINIMIZING NETWORK DISRUPTION VIA GRACEFUL UPGRADE OF ROUTING CONTROLLERS

(71) Applicant: Cisco Technology, Inc., San Jose, CA (US)

(72) Inventors: Prosenjit Sarkar, Santa Clara, CA (US); Satish Kumar Mahadevan, San Ramon, CA (US); Ravi Kiran Chintallapudi, Pleasanton, CA (US); Mahendra Kumar Samarya, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/349,778

(22) Filed: Jul. 10, 2023

(65) Prior Publication Data

US 2024/0340347 A1 Oct. 10, 2024

Related U.S. Application Data

(60) Provisional application No. 63/495,021, filed on Apr. 7, 2023.

(51) Int. Cl.
*H04L 67/141* (2022.01)
*H04L 41/0803* (2022.01)

(52) U.S. Cl.
CPC ........ *H04L 67/141* (2013.01); *H04L 41/0803* (2013.01)

(58) Field of Classification Search
None
See application file for complete search history.

(56) References Cited

U.S. PATENT DOCUMENTS 9,021,459 B1 * 4/2015 Qu ............... G06F 11/1484
  710/33
10,083,026 B1 * 9/2018 Venkata ............ G06F 8/656
(Continued)

OTHER PUBLICATIONS

Cisco: "Cisco SD-WAN Design Guide", Solution Design Guide, Cisco Public, Sep. 1, 2020, Retrieved from https://web.archive.org/web/20210806133945if_/https://www.cisco.com/c/en/us/td/docs/solutions/CVD/SDWAN/cisco-sdwan-design-guide.pdf on Mar. 3, 2023, pp. 1-102, XP093028951, p. 41, Para Sec "OMP Overview", p. 56, Para Sec "vSmart Controller Affinity", p. 83, Para Sec "Application Visibility", p. 95, Para Sec "Policies", p. 13-17, OMP Overview, p. 41-42, WAN Edge Deployment, p. 66-72, Fig 9 p. 51, Fig 40 p. 59-61, Fig 50, p. 83-88, Fig 79-83.

(Continued)

*Primary Examiner* — Ranodhi Serrao
(74) *Attorney, Agent, or Firm* — Polsinelli P.C.

(57) ABSTRACT

Disclosed herein are systems, methods, and computer-readable media for upgrading vSmart controllers. In one aspect, a method includes an edge router receiving a notification from a vSmart controller that an upgrade to the controller will occur. The notification can be dynamically triggered by a centralized network management system. In some embodiments, the vSmart controller can run as a virtual machine (VM) and maintains a control plane connection with one or more edge routers in an overlay network. In response to the notification, a length of time of an expiry timer in which the edge router attempts to connect to the vSmart controller can be increased, and the edge router can connect to the vSmart controller once the increased length of time has passed.

20 Claims, 4 Drawing Sheets

(56) References Cited

U.S. PATENT DOCUMENTS

| | | | |
|---|---|---|---|
| 10,200,274 B1 | | 2/2019 | Suryanarayana et al. |
| 10,873,533 B1 | * | 12/2020 | Ismailsheriff ........... H04L 47/27 |
| 11,750,464 B2 | * | 9/2023 | Gali ....................... H04L 41/40 |
| | | | 709/223 |
| 2006/0215547 A1 | * | 9/2006 | Koppol ................... H04L 69/40 |
| | | | 370/252 |
| 2013/0145359 A1 | | 6/2013 | Hanselmann |
| 2014/0269254 A1 | | 9/2014 | Choorakkot Edakkunni et al. |
| 2016/0019044 A1 | | 1/2016 | Stolarchuk et al. |
| 2016/0315813 A1 | | 10/2016 | Pech et al. |
| 2020/0177629 A1 | * | 6/2020 | Hooda ................. H04L 47/125 |
| 2020/0413283 A1 | * | 12/2020 | Shen ....................... H04L 45/64 |
| 2022/0286360 A1 | * | 9/2022 | Gali ..................... H04L 41/122 |
| 2024/0073084 A1 | * | 2/2024 | Dutia ................. H04L 41/0894 |

OTHER PUBLICATIONS

International Search Report and Written Opinion for International Application No. PCT/US2024/022357, mailed Jun. 27, 2024, 15 Pages.

* cited by examiner

MINIMIZING NETWORK DISRUPTION VIA GRACEFUL UPGRADE OF ROUTING CONTROLLERS

CROSS-REFERENCE TO RELATED APPLICATIONS

The present application claims priority to U.S. Provisional Application No. 63/495,021 filed on Apr. 7, 2023, which is hereby incorporated by reference in its entirety.

BACKGROUND

Legacy networking technology has become increasingly expensive and complex, and it cannot scale to meet the needs of today's multisite enterprises. The software-defined wide area network (SD-WAN) networks offer an elegant, software-based solution that reduces the costs of running enterprise networks and provides straightforward tools to simplify the provisioning and management of large and complex networks that are distributed across multiple locations and geographies. Built into the SD-WAN networks are inherent authentication and security processes that ensure the safety and privacy of the network and its data traffic.

SD-WAN networks provide an evolution of networking from an older, hardware-based model to a secure, software-based, virtual IP fabric. The SD-WAN fabric, also called an overlay network, forms a software overlay that runs over standard network transport services, including the public Internet, Multiprotocol Label Switching (MPLS), and broadband. The overlay network also supports next-generation software services, thereby accelerating the shift to cloud networking. In a given SD-WAN overlay network, routing controller upgrades within the network undergo updates that temporarily bring those devices down. Any network components that connect to an updating routing controller then lose connection and attempt to establish a connection to another routing controller. However, this process of switching between routing controllers can be very disruptive events to the network, because device churn within the network takes up unnecessary time and compute resources that would be better directed elsewhere. What is needed is a coordinated upgrade mechanism in SD-WAN networks.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
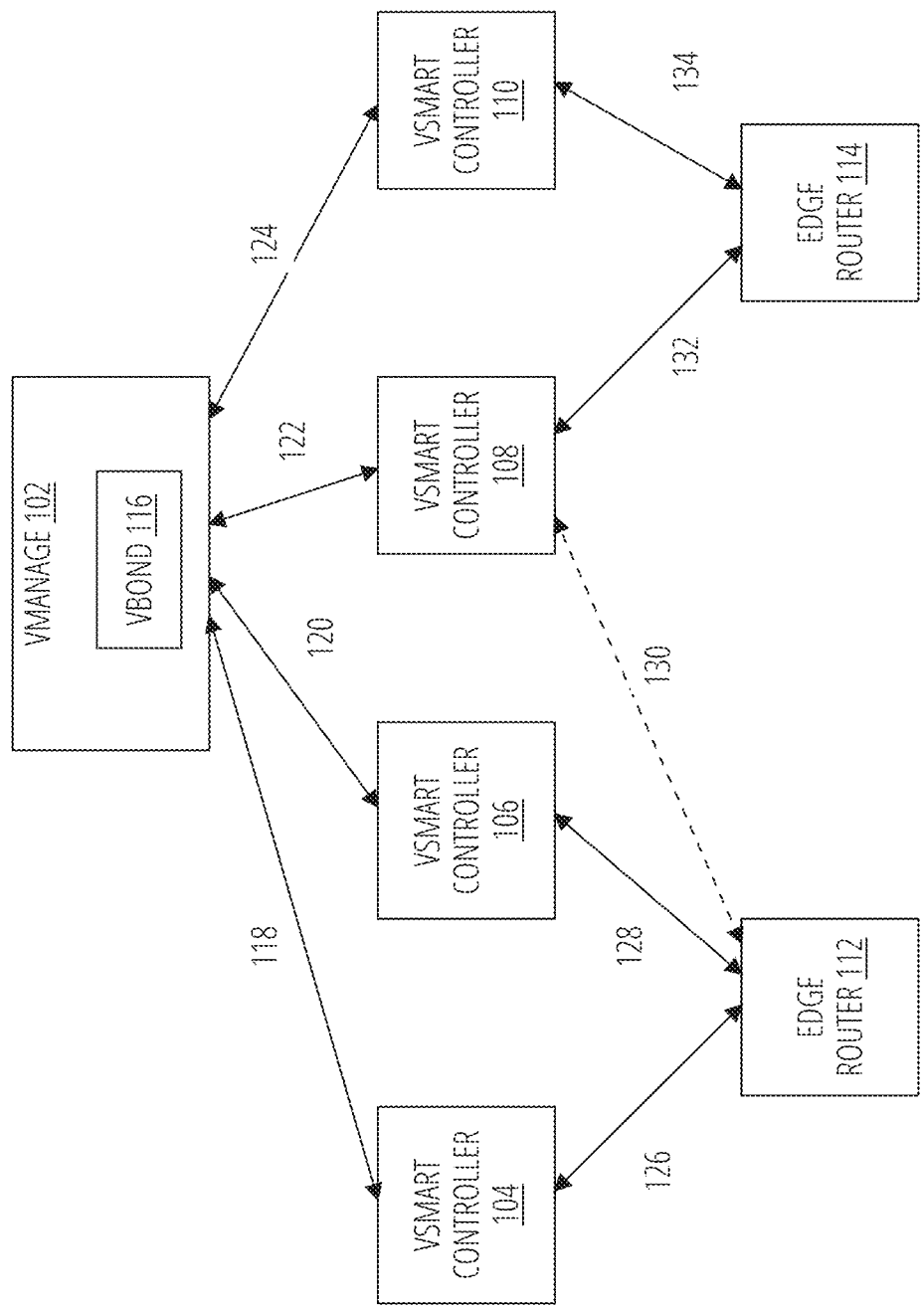
FIG. 1 illustrates an example SD-WAN computing architecture in accordance with an example embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The present disclosure is directed to a coordinated vSmart controller upgrade mechanism for vSmart controllers. The disclosed techniques provide methods, systems, and computer-readable media in which the edge router is able to be smarter about handling its vSmart controller connections and avoiding network connection churn, even if the vSmart controller upgrade process exceeds the duration of the usual retry mechanism present in the edge router.

In one aspect, a graceful upgrade method in an SD-WAN overlay network includes an edge router receiving a notification from a vSmart controller that an upgrade to the controller will occur. The notification can be dynamically triggered by a centralized network management system. In some embodiments, the vSmart controller can run as a virtual machine (VM) and maintains a control plane connection with one or more edge routers in an overlay network. In response to the notification, a length of time of an expiry timer in which the edge router attempts to connect to the vSmart controller can be increased, and the edge router can connect to the vSmart controller once the increased length of time has passed.

In another aspect, the length of time is dynamically increased based on a determination of a length of time of the upgrade, the length of time of the upgrade based on one or more metrics associated with an install of the upgrade.

In another aspect, the method further includes connecting the edge router to two or more controllers, including the vSmart controller. After determining that a connection to the vSmart controller has gone down based on a virtual Disk And Executive MONitor (vDaemon) of the edge router no longer receiving a hello message from the vSmart controller, continuing to hold the connection to the vSmart controller based on the increased length of time of the expiry controller instead of initiating a connection with another vSmart controller.

In another aspect, a routing state of the vSmart controller is held based on the length of time the expiry timer has been increased. The routing state is reconnected and reconverged with the vSmart controller once the vSmart controller comes back up after the upgrade.

In another aspect, the method further includes determining that connecting to the vSmart controller once the length of time has passed has failed. Based on having received the notification, purging all routes learned from the vSmart controller and bypassing OMP graceful restart mode, and initiating connection to another vSmart controller.

In another aspect, other vSmart controllers are upgraded serially in the network until all vSmart controllers are updated.

In another aspect, vManage orchestrates the serial update of the other vSmart controllers.

In one aspect, a computing apparatus includes a processor and a memory storing instructions that, when executed by the processor, configure the apparatus to receive, at an edge router, a notification from a vSmart controller that an upgrade to the controller will occur. The notification can be dynamically triggered by a centralized network management system. In some embodiments, the vSmart controller can run as a virtual machine (VM) and maintains a control plane connection with one or more edge routers in an overlay network. In response to the notification, a length of time of an expiry timer in which the edge router attempts to connect to the vSmart controller can be increased, and the edge router can connect to the vSmart controller once the increased length of time has passed.

In one aspect, a non-transitory computer-readable storage medium, the computer-readable storage medium including instructions that when executed by a computer, cause the computer to receive, at an edge router, a notification from a vSmart controller that an upgrade to the controller will occur. The notification can be dynamically triggered by a centralized network management system. In some embodiments, the vSmart controller can run as a virtual machine (VM) and maintains a control plane connection with one or more edge routers in an overlay network. In response to the notification, a length of time of an expiry timer in which the edge router attempts to connect to the vSmart controller can be increased, and the edge router can connect to the vSmart controller once the increased length of time has passed.

Description of Example Embodiments

In example embodiments, in an SD-WAN overlay network, the virtual IP fabric can be made up of the following components: a vManage service (vManage), vSmart controllers, a vBond Orchestrator service (vBond), and various edge devices (e.g., edge routers). Each edge router is typically connected to at least two vSmart controllers to ensure redundancy. These edge routers always try to maintain these two connections to maintain equilibrium of control connections.

However, during planned upgrade events (or other events in which a vSmart controller will go down), the edge routers connected to the vSmart controller will attempt to find and then establish connections with another vSmart controller. In order to bypass such network churn, the systems and methods disclosed herein example techniques in which the connections to the downed, upgrading vSmart controller are held open. For example, an edge router can receive a notification from a vSmart controller that an upgrade to the controller will occur. The notification can be dynamically triggered by a centralized network management system (vManage). In some embodiments, the vSmart controller can run as a virtual machine (VM) and maintains a control plane connection with one or more edge routers in an overlay network. In response to the notification, a length of time of an expiry timer in which the edge router attempts to connect to the vSmart controller can be increased, and the edge router can connect to the vSmart controller once the increased length of time has passed.

FIG. 1 illustrates an example SD-WAN computing architecture in accordance with an example embodiment. The system comprises a vManage 102 service including a vBond 116 service, and numerous controllers connected to vManage 102. In the example embodiment shown, four controllers are managed by vManage 102: vSmart controller 104 is connected to vManage 102 by connection 118, vSmart controller 106 is connected to vManage 102 by connection 120, vSmart controller 108 is connected to vManage 102 by connection 122, and vSmart controller 110 is connected to vManage 102 by connection 124. While this embodiment shows four controller devices, any number of controllers are contemplated. The system further includes edge routers, each connected to at least two controllers (although any number of redundant controller devices connected to each edge device are contemplated). In the example embodiment shown, edge router 112 is connected to vSmart controller 104 and vSmart controller 106 by connection 126 and connection 128, respectively. Similarly, edge router 114 is connected to vSmart controller 108 and vSmart controller 110 by connection 132, and connection 134, respectively.

In some embodiments, the vManage 102 service can be, for example, a centralized network management system that provides configuration and management of the entire overlay network, such as from a graphical dashboard. A vSmart controller (e.g., vSmart controller 104, vSmart controller 106, vSmart controller 108, vSmart controller 110) can act as a centralized brain controlling the flow of data traffic throughout the network. The vSmart controller, for example, can work with the vBond Orchestrator (vBond 116) to authenticate edge devices as they join the network and to orchestrate connectivity among the edge routers. VBond 116 automatically orchestrates connectivity between edge routers and the various vSmart controllers. If any edge router or vSmart controller is behind a Network address translation (NAT), vBond 116 also serves as an initial NAT-traversal orchestrator. In some embodiments, the edge routers (e.g., edge router 112 and/or edge router 114) can be IOS XE SD-WAN and edge devices that can be, for example, edge routers that sit at the perimeter of a site (such as remote offices, branches, campuses, data centers, etc.) and provide connectivity among the sites. They are either hardware devices or software (cloud routers), that run as a virtual machine. The edge routers can handle the transmission of data traffic.

To ensure continuous availability of each edge router for network traffic, a cluster of SD-WAN vSmart controllers are connected to multiple SD-WAN edge devices, to ensure an edge device is always connected to the desired number of vSmart controllers. Each edge router is typically connected to at least two vSmart controllers to ensure redundancy. These edge routers always try to maintain these two connections to maintain equilibrium of control connections.

Problems arise when, as a result, one of the vSmart controllers goes down for any reason (e.g., vSmart controller 106), and the edge router 112 contacts vBond 116 to ask for other vSmart controllers that can connect with edge router 112. But before doing this, the edge router 112 tries to reconnect to the original vSmart controller (vSmart controller 106) for some time (e.g., in instances, up to 5 minutes (in case the failure is transient)) before giving up and contacting vBond 116 to ask for a new vSmart controller to connect with.

When vSmart controller 106 goes for a reboot during upgrade, the edge devices which were connected to it (e.g., edge router 112) detect this downtime and then try to connect to another new vSmart controller, if available. For example, edge router 112 may attempt to connect to vSmart controller 108 by connection 130. Edge router 112 retains the routes from the upgrading vSmart controller 106 and also downloads new routes from the new vSmart controller 108. Finally, when the upgrading vSmart controller 106 comes back up, the edge router 112 connects back to connection 128 to vSmart controller 106 and also disconnects from connection 130 to the new vSmart controller 108. The edge router 112 then refreshes the routes from the upgrading vSmart controller 106 and also purges the new routes from the new vSmart controller 108. This means that, effectively, the new routes do not serve much useful purpose and end up causing temporary system churn and memory usage increase during the upgrade process.

This process of switching from one vSmart controller to another is a very disruptive event for the network for multiple reasons. For instance, all the routes learned from the initial vSmart controller 106 are still stored/maintained by the edge router 112 (e.g., through an OMP graceful restart process). The routes are learned afresh from the new vSmart controller 108 that the edge router connects to (to maintain equilibrium). And if/when the initial vSmart controller 106 comes back up, the edge router 112 learns it from the periodic digest/hello messages and contacts vBond 116 once again. This causes another disruptive event—vBond 116 will direct the edge router 112 to the same initial vSmart controller 106 (mostly likely due to controller group affinity). This results in more churn, since the routes are once again learned from the initial vSmart controller 106. This behavior is not desirable, but is often necessary and is usually the best way to deal with unexpected vSmart controller failures. However, in the case of planned vSmart controller downtime (like software upgrades of vSmart controller 106), this unnecessary churn can/should be avoided, since the vSmart controller 106 is going to come back up anyway with the newer software image and there is no reason for the edge router 112 to try connecting to a new vSmart controller in the interim and causing a lot of churn in the network. But the problem is that the edge router 112 has no way of distinguishing between genuine vSmart controller 106 failures and vSmart controller 106 upgrade scenarios.

The methods, systems, and techniques herein propose a coordinated vSmart controller upgrade mechanism between vManage 102, the vSmart controllers (e.g., vSmart controller 104, vSmart controller 106, vSmart controller 108, and vSmart controller 110) and the edge routers (edge router 112 and edge router 114). This allows, for example, the edge router 112 to be smarter about handling its vSmart controller connections and avoiding churn, even if the vSmart controller 106 upgrade process exceeds the duration of the usual retry mechanism present in edge router 112. In other words, the vSmart controller 106 can perform a graceful upgrade process, where the vSmart controller 106 will notify its peer edge device(s) (such as edge router 112) that it is undergoing an upgrade and the peer edge device(s) will not establish connections with any new vSmart controller for the duration of the upgrade. For example, in some embodiments, the peer edge device may otherwise attempt to connect to other BGP peers and/or learn routes from multiple BGP peers during the upgrade window. This will avoid causing temporary system churn and memory usage increases during the upgrade.

For example, in some embodiments, vManage 102 can schedule an upgrade for vSmart controller 106. Edge router 112 can receive a notification from vSmart controller 106 that an upgrade to the vSmart controller 106 will occur. The notification can be dynamically triggered by a centralized network management system (e.g., vManage 102). In some embodiments, the vSmart controller 106 runs as a virtual machine (VM) and maintains a control plane connection with one or more edge routers (e.g., edge router 112) in an overlay network.

In response to the notification from vSmart controller 106, the expiry timer can be increased on edge router 112, so that the edge router 112 attempts to connect to the vSmart controller 106 after a longer period of time has passed. This modified expiry timer gives more time for vSmart controller 106 to come back up, allowing it to finish its upgrade process while preventing the edge router 112 from attempting to establish connection 130 to vSmart controller 108. In some embodiments, the modification to the expiry timer can be dynamically determined based on a determination of a specific length of time of the upgrade. For example, the length of time of the upgrade can be determined based on one or more metrics associated with a specific install of the upgrade, allowing the modification in the expiry timer to coincide with the specific timing needs of each upgrade install.

Once the modified expiry timer has expired, the edge router 112 can reconnect to the vSmart controller 106. In this way, the edge router 112 can hold a routing state of the vSmart controller 106 based on the length of time the expiry timer has been increased/modified. The edge router 112 can additionally and/or alternatively reconnect and reconverge the routing state with the vSmart controller 106 once the vSmart controller 106 comes back up after the upgrade. In some embodiments, the edge router 112 can continue to hold the connection to the vSmart controller 106 based on the modified expiry controller instead of initiating a connection with another vSmart controller 108 after determining that a connection to the vSmart controller 106 has gone down based on a virtual Disk And Executive MONitor (vDaemon) of the edge router 112 no longer receiving a hello message from the vSmart controller 106.

In some embodiments, vManage 102 can orchestrate an upgrade to a portion or all of the vSmart controllers. For example, vManage 102 can initiate the above sequence of steps for each vSmart controller serially when multiple vSmart controllers need to be upgrade to a newer version of the software release. This provides an extremely streamlined and non-disruptive software upgrade experience for the network administrator.

In some instances, the vSmart controller 106 fails to come back up. To handle this case, the edge router 112 can determine that connecting to the vSmart controller once the modified expiry timer has lapsed has failed. Based on this determination, the edge router 112 can purge all routes learned from the vSmart controller 106, thus bypassing OMP graceful restart mode. The edge router 112 can then initiate connection to another controller, such as vSmart controller 108.

Figure 2:
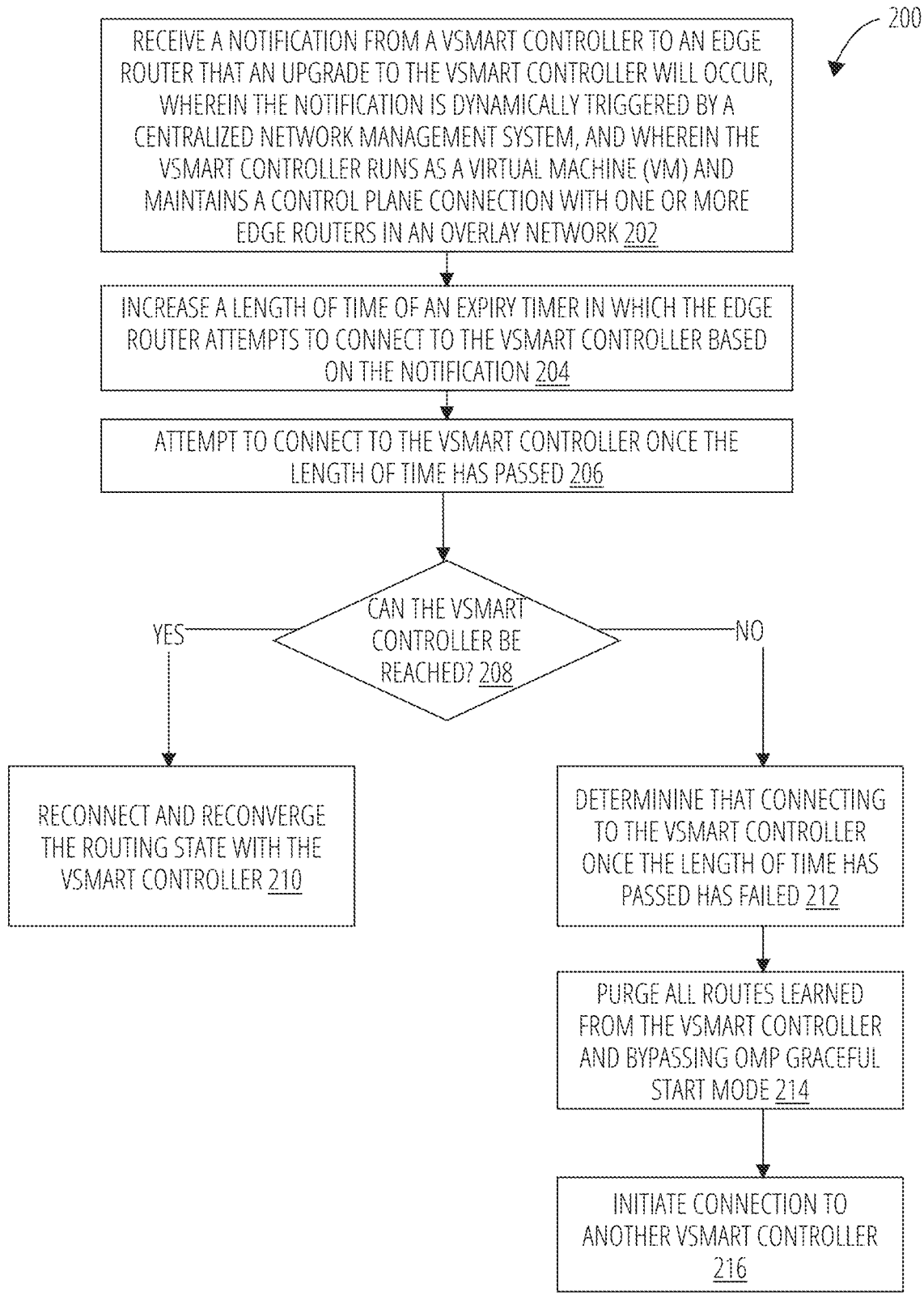
FIG. 2 illustrates a flowchart for implementing a coordinated upgrade in an SD-WAN network in accordance with an example embodiment.

FIG. 2 illustrates a flowchart for implementing a coordinated upgrade routine 200 in an SD-WAN network in accordance with an example embodiment. Although the example routine 200 depicts a particular sequence of operations, the sequence may be altered without departing from the scope of the present disclosure. For example, some of the operations depicted may be performed in parallel or in a different sequence that does not materially affect the function of the routine 200. In other examples, different components of an example device or system that implements the routine 200 may perform functions at substantially the same time or in a specific sequence.

According to some examples, the method includes receiving a notification at block 202 from a vSmart controller to an edge router that an upgrade to the vSmart controller will occur. In some embodiments, the notification can be dynamically triggered by a centralized network management system (such as vManage). In the SD-WAN network, the vSmart controller can run as a virtual machine (VM) and maintain a control plane connection with one or more edge routers in the overlay network.

According to some examples, the method includes increasing a length of time of an expiry timer in which the edge router attempts to connect to the vSmart controller based on the notification at block 204. This generates a modified expiry timer, giving the vSmart controllers enough time to finish its upgrade before the edge router attempts to reconnect. The modified expiry timer can be personalized to the specific upgrade—for example, one or more metrics of the software upgrade can be used to determine the length of time of the software upgrade to the vSmart controller, allowing the expiry timer to be lengthened (or decreased) in time based on the specific needs of the upgrade. The determination of upgrade timing needs may even be determined on a dynamic, real-time or almost real-time basis (such as through monitoring by vManage).

According to some examples, the method includes the edge router attempting to connect to the vSmart controller once the length of time has passed at block 206. Decision block 208 then determines whether the edge router can reach the vSmart controller. If the vSmart controller can be reached, the edge router can reconnect and reconverge the routing state with the vSmart controller at block 210.

However, according to some examples, the method includes determining that connecting to the vSmart controller once the length of time has passed has failed at block 212. If the vSmart controller cannot be reached, the method includes purging all routes learned from the vSmart controller and bypassing OMP graceful restart mode at block 214. The edge router then initiates connection to another vSmart controller at block 216.

Figure 3:
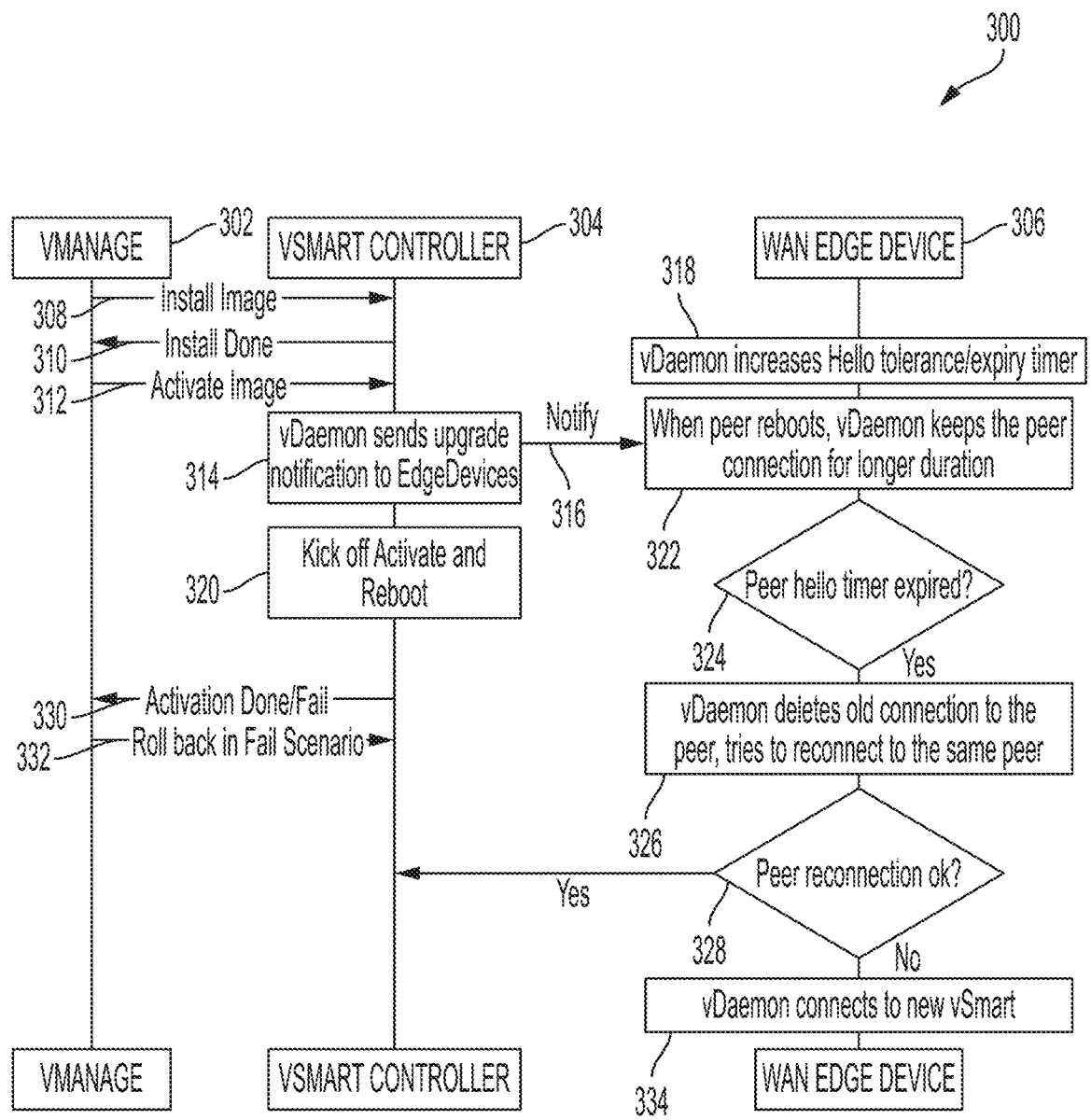
FIG. 3 illustrates an example communication diagram for implementing a graceful upgrade in an SD-WAN network in accordance with an example embodiment.

FIG. 3 illustrates an example communication diagram for implementing a graceful upgrade in an SD-WAN network in accordance with an example embodiment. For example, system 300 can include vManage 302, a vSmart controller 304, and a WAN Edge Device 306. This example workflow shows how the methods, systems, and techniques for graceful upgrade introduces coordination and interlocks between vManage 302, its various vSmart controller such as vSmart 304, and associated edge routers (e.g., WAN Edge Device 306) during a vSmart software upgrade, to provide for a graceful upgrade with minimal disruption.

For example, in some embodiments, the upgrade starts when vManage 302 installs image 308 at the vSmart controller 304. The vSmart 304 informs vManage 302 that the install is done 310. VManage 302 then activates 312 the image and the vDaemon prepares to send 314 an upgrade notification to the appropriate edge devices. The vSmart 304 performs a graceful upgrade, where it will notify 316 peer edge device(s) (including WAN Edge Device 306) that it is undergoing an upgrade (e.g., the "prepare for upgrade" notification).

In response to this notification, the WAN Edge Device 306 will tweak its control connection state machine to wait for a longer duration (e.g., the peer graceful upgrade wait time) before establishing connections with any new vSmart controllers. This peer-graceful-upgrade-wait time is longer than the default retry-timeout (in this embodiment, the default retry-timeout of 5 minutes). For example, the vDaemon can increase 318 the Hello tolerance/expiry timer to encompass the length of time of the upgrade. In some embodiments, the peer-graceful-upgrade-wait time can modify the expiry timer on a dynamic determination of how long the specific upgrade will take, based on the upgrade type, the specific device of WAN Edge Device 306, the strength of the connection on which the upgrade is taking place, etc.

In other words, the vDaemon on WAN Edge Device 306 should give grace time to the vDaemon on the vSmart 304 undergoing the upgrade. The vDaemon on the upgrading vSmart 304 can notify 316 all peer vDaemons to "Prepare for Upgrade". The edge vDaemon can increase the hello expiry/tolerance timer value for the upgrading vSmart peer to a big value (e.g., 10 mins). The expiry/tolerance timer value can be called the "Peer Graceful Upgrade Wait Time". This will ensure it won't try to connect to any new vSmart for the increased duration.

vSmart 304 will kick off Activate 320 which will finally reboot the device. Once the reboot is started, the control connection(s) to its peer Edges will go down and peer Edge vDaemons will stop receiving any hellos from the rebooting vSmart 304 but will hold 322 the connection(s) to it because of the increased hello expiry timer value.

Once the upgrading vSmart 304 comes back up after reboot, the vDaemon on vSmart 304 will be ready to accept connections from peer Edges. Once the increased hello expiry timer expires 324, the WAN Edge Device 306 vDaemon will delete 326 all the old connection(s) to the upgraded peer vSmart 304 and then will re-establish the connection(s) with it. A feature here is that the increased hello expiry timer value (i.e., Peer Graceful Upgrade Wait Time) should always be greater than the actual time taken for the peer vSmart 304 upgrade.

Once the upgrading vSmart 304 comes back up after the software upgrade, the WAN Edge Device 306 will reconnect and reconverge all the routing state (being held intact due to graceful restart) if the peer reconnection is ok 328.

In some embodiments, the vSmart 304 may fail 330 at Activation. If so, vManage 302 may roll back 332 in the failure scenario. In some embodiments, vSmart 304 may resend the notification 316 to reset the expiry timer. In other embodiments, the vSmart 304 and/or vManage 302 may allow the upgrade to fail.

In case the vSmart 302 does not come back up after the upgrade, the WAN Edge Device 306 will contact vBond at the end of the peer-graceful-upgrade-wait-time. But since the WAN Edge Device 306 knows that vSmart 304 may be permanently down, the WAN Edge Device 306 will not go into OMP graceful restart mode and will purge all the routes learned from vSmart 304. The WAN Edge Device 306 will instead connect 334 to a new vSmart as chosen by vBond (orchestrator). This ensures that even in the case of upgrade failures, system/network churn and memory usage spikes (and the resulting instability) are avoided.

In some embodiments, in case the upgrading vSmart 304 does not come back up in the increased hello expiry time, the WAN Edge Device 306 vDaemon will delete all the old connection(s) to the upgrading peer vSmart 304 but then will not be able to re-establish the connection(s) with it. So, instead it will connect 334 to an un-chosen different vSmart 304 in the same/different region, to satisfy max-control-connections.

In some embodiments, when multiple vSmart controllers need to be upgraded to a newer version of the software release, the above sequence of steps can be repeated for each vSmart serially as a rolling upgrade. This can be orchestrated from vManage 302. This provides an extremely streamlined and non-disruptive software upgrade experience for the network administrator.

In summary, software upgrades of controllers cause unnecessary churn and disruption in the overlay network. The methods, systems, and techniques described above provide a streamlined mechanism that coordinates the upgrade process across vManage 302/vSmart 304/WAN Edge Device 306 and integrates with the OMP routing protocol to avoid any churn/disruption, while providing a very convenient workflow for the end user to handle controller software upgrades.

Figure 4:
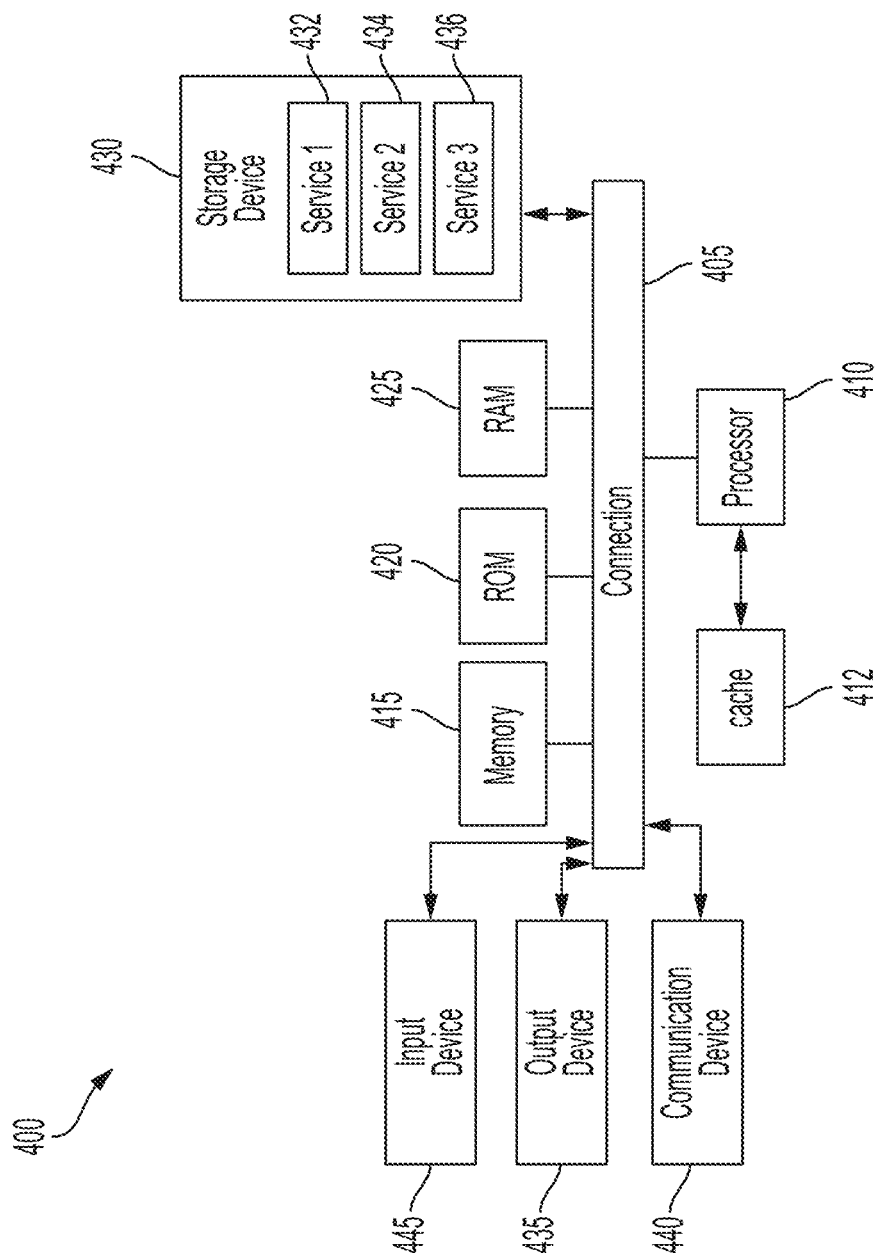
FIG. 4 shows an example of a computing system, according to some aspects of the present disclosure.

FIG. 4 shows an example of computing system 400, which can be for example any computing device or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
receiving a notification from a vSmart controller to an edge router that an upgrade to the vSmart controller will occur, wherein the notification is dynamically triggered by a centralized network management system, and wherein the vSmart controller runs as a virtual machine (VM) and maintains a control plane connection with one or more edge routers in an overlay network;
increasing a length of time of an expiry timer in which the edge router attempts to connect to the vSmart controller based on the notification; and
connecting to the vSmart controller once the length of time has passed.

2. The method of claim 1, wherein the length of time of the expiry timer is dynamically increased based on a determination of a length of time of the upgrade, the length of time of the upgrade is based on one or more metrics associated with an install of the upgrade.

3. The method of claim 1, the method further comprising:
connecting the edge router to two or more controllers, including the vSmart controller; and
after determining that a connection to the vSmart controller has gone down based on a virtual Disk And Executive MONitor (vDaemon) of the edge router no longer receiving a hello message from the vSmart controller, continuing to hold the connection to the vSmart controller based on the increased length of time of the expiry controller instead of initiating a connection with another vSmart controller.

4. The method of claim 1, further comprising:
holding a routing state of the vSmart controller based on the length of time the expiry timer has been increased; and
reconnecting and reconverging the routing state with the vSmart controller once the vSmart controller comes back up after the upgrade.

5. The method of claim 1, further comprising:
determining that connecting to the vSmart controller once the length of time has passed has failed;
based on having received the notification, purging all routes learned from the vSmart controller and bypassing OMP graceful restart mode; and
initiating connection to another vSmart controller.

6. The method of claim 1, wherein other vSmart controllers are upgraded serially in the network until all vSmart controllers are updated.

7. The method of claim 6, wherein vManage orchestrates the serial update of the other vSmart controllers.

8. A computing apparatus comprising:
a processor; and
a memory storing instructions that, when executed by the processor, configure the apparatus to:
receive a notification from a vSmart controller to an edge router that an upgrade to the vSmart controller will occur, wherein the notification is dynamically triggered by a centralized network management system, and wherein the vSmart controller runs as a virtual machine (VM) and maintains a control plane connection with one or more edge routers in an overlay network;
increase a length of time of an expiry timer in which the edge router attempts to connect to the vSmart controller based on the notification; and
connect to the vSmart controller once the length of time has passed.

9. The computing apparatus of claim 8, wherein the length of time of the expiry timer is dynamically increased based on a determination of a length of time of the upgrade, the length of time of the upgrade is based on one or more metrics associated with an install of the upgrade.

10. The computing apparatus of claim 8, the method wherein the instructions further configure the apparatus to:
connect the edge router to two or more controllers, including the vSmart controller; and
after determining that a connection to the vSmart controller has gone down based on a virtual Disk And Executive MONitor (vDaemon) of the edge router no longer receive a hello message from the vSmart controller, continuing to hold the connection to the vSmart controller based on the increased length of time of the expiry controller instead of initiating a connection with another vSmart controller.

11. The computing apparatus of claim 8, wherein the instructions further configure the apparatus to:
hold a routing state of the vSmart controller based on the length of time the expiry timer has been increased; and
reconnect and reconverge the routing state with the vSmart controller once the vSmart controller comes back up after the upgrade.

12. The computing apparatus of claim 8, wherein the instructions further configure the apparatus to:
determine that connecting to the vSmart controller once the length of time has passed has failed;
based on having received the notification, purge all routes learned from the vSmart controller and bypassing OMP graceful restart mode; and
initiate connection to another vSmart controller.

13. The computing apparatus of claim 8, wherein other vSmart controllers are upgraded serially in the network until all vSmart controllers are updated.

14. The computing apparatus of claim 13, wherein vManage orchestrates the serial update of the other vSmart controllers.

15. A non-transitory computer-readable storage medium, the computer-readable storage medium including instructions that when executed by a computer, cause the computer to:
receive a notification from a vSmart controller to an edge router that an upgrade to the vSmart controller will occur, wherein the notification is dynamically triggered by a centralized network management system, and wherein the vSmart controller runs as a virtual machine (VM) and maintains a control plane connection with one or more edge routers in an overlay network;
increase a length of time of an expiry timer in which the edge router attempts to connect to the vSmart controller based on the notification; and
connect to the vSmart controller once the length of time has passed.

16. The non-transitory computer-readable storage medium of claim 15, wherein the length of time of the expiry timer is dynamically increased based on a determination of a length of time of the upgrade, the length of time of the upgrade is based on one or more metrics associated with an install of the upgrade.

17. The non-transitory computer-readable storage medium of claim 15, the method wherein the instructions further configure the computer to:
connect the edge router to two or more controllers, including the vSmart controller; and
after determining that a connection to the vSmart controller has gone down based on a virtual Disk And Executive MONitor (vDaemon) of the edge router no longer receive a hello message from the vSmart controller, continuing to hold the connection to the vSmart controller based on the increased length of time of the expiry controller instead of initiating a connection with another vSmart controller.

18. The non-transitory computer-readable storage medium of claim 15, wherein the instructions further configure the computer to:
hold a routing state of the vSmart controller based on the length of time the expiry timer has been increased; and
reconnect and reconverge the routing state with the vSmart controller once the vSmart controller comes back up after the upgrade.

19. The non-transitory computer-readable storage medium of claim 15, wherein the instructions further configure the computer to:
determine that connecting to the vSmart controller once the length of time has passed has failed;
based on having received the notification, purge all routes learned from the vSmart controller and bypassing OMP graceful restart mode; and
initiate connection to another vSmart controller.

20. The non-transitory computer-readable storage medium of claim 15, wherein other vSmart controllers are upgraded serially in the network until all vSmart controllers are updated.

* * * * *